United States Patent
Konaka et al.

(10) Patent No.: US 11,424,697 B2
(45) Date of Patent: Aug. 23, 2022

(54) PROTECTION DEVICE

(71) Applicant: FANUC CORPORATION, Minamitsuru-gun (JP)

(72) Inventors: Yudai Konaka, Yamanashi-ken (JP); Kenji Kawai, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 156 days.

(21) Appl. No.: 16/841,310

(22) Filed: Apr. 6, 2020

(65) Prior Publication Data

US 2020/0328699 A1 Oct. 15, 2020

(30) Foreign Application Priority Data

Apr. 12, 2019 (JP) .............................. JP2019-076573

(51) Int. Cl.
*H02P 3/22* (2006.01)

(52) U.S. Cl.
CPC ....................................... *H02P 3/22* (2013.01)

(58) Field of Classification Search
CPC ........... H02P 3/22; H02K 23/24; H02K 17/28
USPC ............................... 318/379, 400.21, 400.22
See application file for complete search history.

(56) References Cited

U.S. PATENT DOCUMENTS

| | | | | |
|---|---|---|---|---|
| 2013/0221888 A1* | 8/2013 | Horikoshi | ............... | H02P 27/06 318/400.29 |
| 2016/0226407 A1* | 8/2016 | Saitou | ................. | H02P 29/0241 |
| 2017/0016958 A1* | 1/2017 | Saito | ......................... | H02P 3/22 |
| 2017/0250645 A1* | 8/2017 | Tateda | .................. | H02P 29/032 |
| 2019/0113576 A1* | 4/2019 | Saito | ................... | H02P 29/0241 |
| 2019/0288615 A1* | 9/2019 | Fujii | ........................ | H02P 3/22 |

FOREIGN PATENT DOCUMENTS

| | | |
|---|---|---|
| JP | H09-046813 A | 2/1997 |
| JP | H09-182475 A | 7/1997 |
| JP | H11-122941 A | 4/1999 |
| JP | 2007-282313 A | 10/2007 |
| JP | 2009-142115 A | 6/2009 |

(Continued)

OTHER PUBLICATIONS

Japanese Office Action, dated Jul. 6, 2021, in Japanese Application No. 2019-076573 and English Translation thereof.

(Continued)

*Primary Examiner* — Jorge L Carrasquillo
(74) *Attorney, Agent, or Firm* — McGinn IP Law Group, PLLC

(57) ABSTRACT

A protection device provided between a synchronous motor having a plurality of windings and a motor driving device for driving the synchronous motor includes: a switching unit for making and breaking the connection between the motor driving device and the synchronous motor; a dynamic brake circuit including resistors and switches, to short-circuit the plurality of windings between the switching unit and the synchronous motor via the resistors; and a control device for controlling the switching unit and the dynamic brake circuit. The control device controls the switches in the dynamic brake circuit to short-circuit the plurality of windings, and then controls the switching unit to cut off the connection between the motor driving device and the synchronous motor.

15 Claims, 4 Drawing Sheets

(56) References Cited

FOREIGN PATENT DOCUMENTS

| | | |
|---|---|---|
| JP | 2013-179741 A | 9/2013 |
| JP | 6285477 B2 | 2/2018 |
| WO | WO-2015132956 A1 * | 9/2015 ............... H02K 7/10 |

OTHER PUBLICATIONS

Japanese Office Action, dated Oct. 5, 2021, in Japanese Application No. 2019-076573 and English Translation thereof.

* cited by examiner

PROTECTION DEVICE

CROSS-REFERENCE TO RELATED APPLICATION

This application is based upon and claims the benefit of priority from Japanese Patent Application No. 2019-076573 filed on Apr. 12, 2020, the contents of which are incorporated herein by reference.

BACKGROUND OF THE INVENTION

Field of the Invention

The present invention relates to a protection device that protects a synchronous motor and a motor driving device that drives the synchronous motor.

Description of the Related Art

As described in Japanese Patent No. 6285477, dynamic brake circuits have been widely used for emergency stop of a motor driven by a motor driving device. The dynamic brake circuit is a circuit that short-circuits multiple windings of a motor via resistors to convert rotational energy into Joule heat to brake the rotation of the motor.

SUMMARY OF THE INVENTION

There is a relationship between the resistance value of the resistor used in the dynamic brake circuit and the braking force on the motor. When the resistance value is made smaller, the short-circuit current increases, and the magnets of the motor rotor may be demagnetized or the driving device may be destroyed due to an overcurrent. On the other hand, when the resistance value is made greater, the potential difference during short circuit between the power lines for different phases increases during short circuit, so that there is a risk that the potential difference exceeds the withstand voltage of the driving device including an inverter. Therefore, there is a problem that an appropriate resistance value to protect the motor cannot be selected.

It is therefore an object of the present invention to provide a protection device that can appropriately select a resistance value of the resistor used in a dynamic brake circuit while protecting a synchronous motor and a motor drive device.

According to one aspect of the present invention, a protection device provided between a synchronous motor having a plurality of windings and a motor driving device for driving the synchronous motor, includes: a switching unit configured to make and break the connection between the motor driving device and the synchronous motor; a dynamic brake circuit including resistors and switches, and configured to short-circuit the plurality of windings between the switching unit and the synchronous motor via the resistors; and a control device configured to control the switching unit and the dynamic brake circuit. The control device is configured to control the switches in the dynamic brake circuit to short-circuit the plurality of windings, and then control the switching unit to cut off the connection between the motor driving device and the synchronous motor.

According to the present invention, it is possible to appropriately select the resistance values of the resistors used in the dynamic brake circuit while protecting the synchronous motor and the motor driving device.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of a protection device according to the present invention will be described below in detail with reference to the accompanying drawings.

EMBODIMENT

Figure 1:
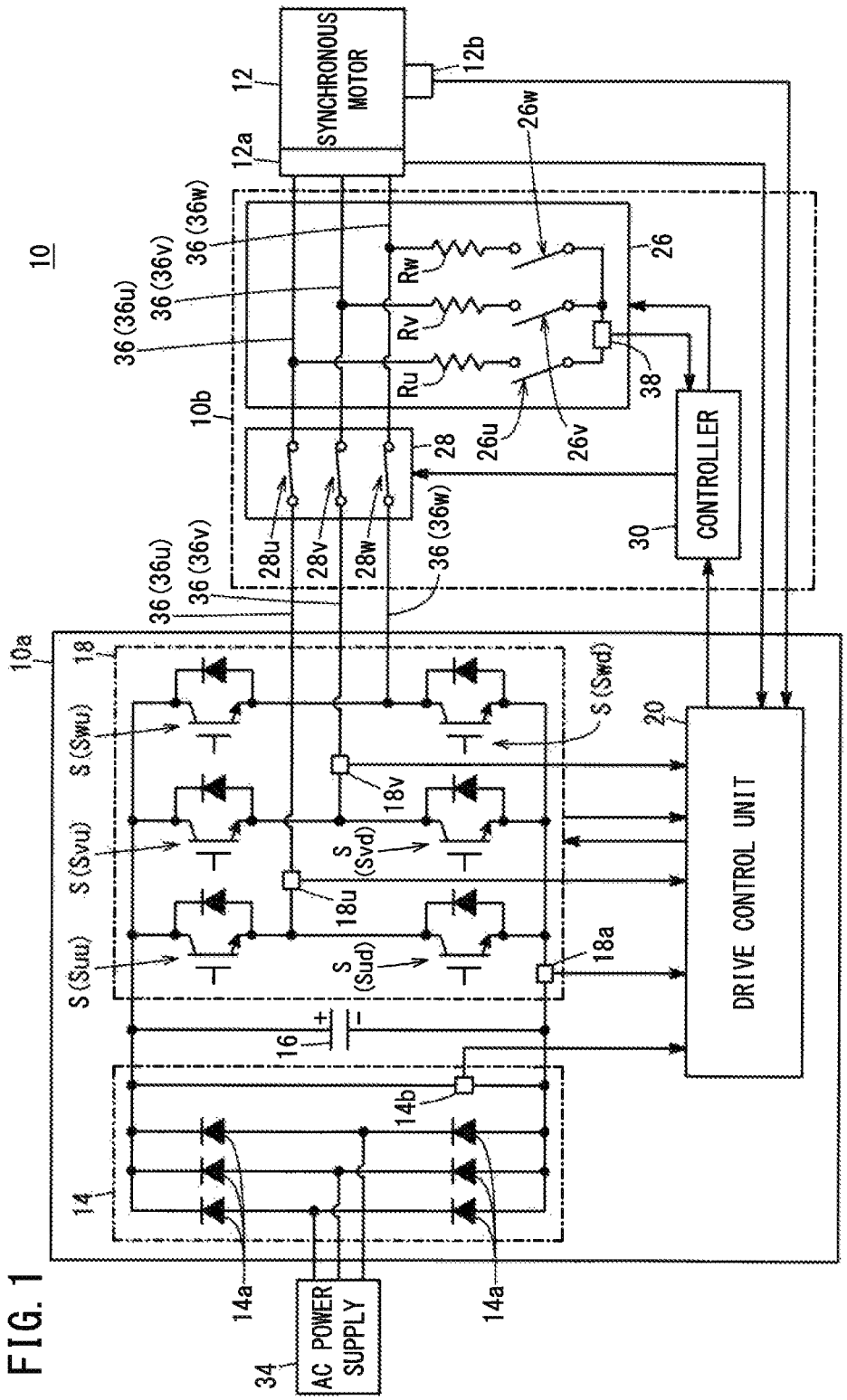
FIG. 1 is a diagram illustrating a configuration example of a motor drive system according to an embodiment.

FIG. 1 is a diagram showing a configuration example of a motor drive system 10 according to the embodiment. The motor drive system 10 includes a motor driving device 10a, a protection device 10b and a synchronous motor 12. The motor driving device 10a is a driving device that drives the synchronous motor 12.

The motor driving device 10a includes a rectifier 14, a smoothing capacitor 16, an inverter unit 18, and a drive control unit 20 that controls the inverter unit 18.

The protection device 10b is arranged between the motor driving device 10a and the synchronous motor 12, that is, between the inverter unit 18 and the synchronous motor 12. The protection device 10b includes a dynamic brake circuit 26, a switching unit 28 and a control device 30 that controls the dynamic brake circuit 26 and the switching unit 28.

In this embodiment, though not shown, the synchronous motor 12 has three-phase (UVW) windings (motor coils). The synchronous motor 12 is not limited to three-phase as long as it has multiple windings. Further, the synchronous motor 12 is provided with an encoder 12a for detecting the rotational position of the synchronous motor 12, and a temperature sensor 12b for detecting the temperature of a winding of the synchronous motor 12.

The rectifier 14 rectifies the AC (alternating current) voltage supplied from an AC power supply 34 into DC (direct current) voltage. The smoothing capacitor 16 smooths the DC voltage rectified by the rectifier 14. In the present embodiment, the AC power supply 34 supplies a three-phase (UVW) AC voltage to the rectifier 14. The rectifier 14 has two diodes 14a connected in series for each phase. The connection point where the two diodes 14a are connected in series is connected to the terminal for each phase of the AC power supply 34. The series of two diodes 14a is connected in parallel with the smoothing capacitor 16. Further, the rectifier 14 includes a voltage sensor 14b that measures the voltage across the smoothing capacitor 16. Note that the rectifier 14 may have a configuration in which switching elements are added to diodes 14a.

The inverter unit 18 converts the DC voltage rectified by the rectifier 14 (specifically, the voltage across the smoothing capacitor 16) into AC voltage, supplies the AC voltage to the synchronous motor 12 to drive the synchronous motor 12. The inverter unit 18 has multiple switching elements (semiconductor switching elements) S. The multiple switching elements S include an upper-arm switching element Suu and a lower-arm switching element Sud for the U-phase, an upper-arm switching element Svu and a lower-arm switching element Svd for the V-phase, and an upper-arm switching element Swu and a lower-arm switching element Swd for the W-phase.

The switching element S of the upper arm and the switching element S of the lower arm are connected in series for each phase, and the series of the switching element S of the upper arm and the switching element S of the lower arm is connected in parallel with the smoothing capacitor 16.

The connection point at which the switching element Suu and the switching element Sud are connected in series is connected to the U-phase winding of the synchronous motor 12 via a power line 36u. The connection point at which the switching element Svu and the switching element Svd are connected in series is connected to the V-phase winding of the synchronous motor 12 via a power line 36v. The connection point at which the switching element Swu and the switching element Swd are connected in series is connected to the W-phase winding of the synchronous motor 12 via a power line 36w.

The inverter unit 18 includes a current sensor 18a for measuring the current between the negative terminal of the smoothing capacitor 16 and the switching elements Sud, Svd, and Swd of the lower arm, a current sensor 18u for measuring the current flowing through the power line 36u, and a current sensor 18v for measuring the current flowing through the power line 36v.

The inverter unit 18 performs the switching operations (on/off operations) of the three-phase upper-arm switching elements Suu, Svu and Swu and the three-phase lower-arm switching elements Sud, Svd and Swd to convert the voltage across the smoothing capacitor 16 (which will be referred to as the capacitor voltage hereinbelow) into AC voltage and drive the synchronous motor 12.

The drive control unit 20 drives the synchronous motor 12 by controlling the switching operations of the multiple switching elements S in the inverter unit 18 in accordance with commands from a controller (not shown). Further, the drive control unit 20 performs feedback control based on the rotation speed of the synchronous motor 12 acquired on the basis of the rotation position detected by the encoder 12a.

The drive control unit 20 monitors the temperature of the windings of the synchronous motor 12 via the temperature sensor 12b in addition to the rotation speed (rotation speed) of the synchronous motor 12. Further, the drive control unit 20 monitors the voltage of the synchronous motor 12 based on the measurement from the voltage sensor 14b, and also monitors the current of the synchronous motor 12 based on the measurements from the current sensors 18a, 18u and 18v. The drive control unit 20 detects an abnormality of the synchronous motor 12 based on the monitored rotation speed, current, voltage or temperature of the windings, and transmits an abnormality signal to the control device 30.

Further, the drive control unit 20 uses the voltage sensor 14b and the current sensors 18a, 18u, 18v, etc., to obtain the current or voltage inside the circuit of the motor driving device 10a (the circuit of the rectifier 14, the smoothing capacitor 16 and the inverter unit 18). The drive control unit also detects an abnormality of the motor driving device 10a based on the acquired current or voltage value, and transmits an abnormality signal to the control device 30. The abnormalities of the motor driving device 10a include a disconnection inside the circuit of the inverter unit 18 and others.

When the drive control unit 20 transmits an abnormal signal to the control device 30, the control device 30 can control the dynamic brake circuit 26 to appropriately put the brakes on the synchronous motor 12 and stop the synchronous motor 12 as described later.

The switching unit 28 is provided on the power lines 36 (36u, 36v, 36w) for the phases that connect the inverter unit 18 and the synchronous motor 12, so as to make or break the connection between the motor driving device 10a and the synchronous motor 12. The switching unit 28 includes a switch 28u provided on the power line 36u, a switch 28v provided on the power line 36v and a switch 28w provided on the power line 36w.

The switching unit 28 connects the inverter unit 18 and the synchronous motor 12 as it turns on the switches 28u, 28v, 28w, and breaks the connection between the motor driving device 10a (inverter unit 18) and the synchronous motor 12 as it turns off the switches 28u, 28v, 28w. When the synchronous motor 12 is driven by the motor driving device 10a, the motor driving device 10a and the synchronous motor 12 are connected. FIG. 1 shows a state in which the switches 28u, 28v, 28w are turned on so that the motor driving device 10a and the synchronous motor 12 are connected.

The dynamic brake circuit 26 is a circuit for applying braking force to the synchronous motor 12 to stop the motor when an abnormality occurs. The dynamic brake circuit 26 includes resistors Ru, Rv and Rw, and switches 26u, 26v and 26w that short-circuit the multiple windings provided for the phases in the synchronous motor 12 via the resistors Ru, Rv and Rw.

When the switches 26u, 26v and 26w of the dynamic brake circuit 26 are turned on, the power lines 36 (36u, 36v, 36w) are short-circuited to each other via the resistors Ru, Rv and Rw. As a result, the multiple windings of the synchronous motor 12 are short-circuited via the resistors Ru, Rv and Rw. Thereby, the electric power generated in the synchronous motor 12 can be rapidly consumed by the resistors Ru, Rv and Rw, so that the synchronous motor 12 can be braked. When the synchronous motor 12 is driven by the motor driving device 10a, as shown in FIG. 1 the switches 26u, 26v, 26w are controlled to be off such that the power lines 36 are not short-circuited.

FIG. 1 shows an example in which the dynamic brake circuit 26 includes the multiple resistors Ru, Rv, Rw and the multiple switches 26u, 26v, 26w. That is, in the dynamic brake circuit 26 of FIG. 1, one resistor and one switch are provided for each phase. However, the dynamic brake circuit 26 may include one or more resistors and one or more switches for each phase.

It should be noted that the configuration of the dynamic brake circuit 26 is not limited to the configuration shown in FIG. 1 and that described above as long as the dynamic brake circuit has a structure that includes one or more resisters and one or more switches so as to short-circuit the multiple windings of the synchronous motor 12 between the switching unit 28 and the synchronous motor 12 via resistors.

The dynamic brake circuit 26 further includes a detector 38 for detecting the current flowing through the resistor Ru. The detector 38 is a current detector, and is provided for the control device 30 to determine whether or not the multiple windings of the synchronous motor 12 are short-circuited. Therefore, the detector 38 may be arranged at a position for detecting the current flowing through the resistor Rv or the resistor Rw. The detector 38 may be a voltage detector installed so as to detect the voltage across any one of the resistors Ru, Rv and Rw. The detector 38 sends the detected current value or voltage value to the control device 30 as a detection signal.

The control device 30 controls the dynamic brake circuit 26 (switches 26u, 26v, 26w) and the switching unit 28 (switches 28u, 28v, 28w). When detecting an abnormality in the synchronous motor 12 or the motor driving device 10a, the control device 30 controls the switches 26u, 26v and 26w of the dynamic brake circuit 26 to short-circuit the multiple windings of the synchronous motor 12 first. Then, after short-circuiting the multiple windings of the synchronous motor 12, the control device 30 controls the switching unit 28 to cut off the connection between the inverter unit 18 and the synchronous motor 12. Thus, when an abnormality occurs in the synchronous motor 12 or the motor driving device 10a, the synchronous motor 12 can be emergency stopped.

Specifically, when receiving an abnormal signal from the drive control unit 20, the control device 30 controls the switches 26u, 26v and 26w to be turned on. Then, the control device 30, based on the detection signal from the detector 38, determines whether or not the multiple windings of the synchronous motor 12 are short-circuited. When the current value or the voltage value indicated by the detection signal from detector 38 exceeds a predetermined current threshold or a predetermined voltage threshold, the control device 30 determines that the multiple windings of synchronous motor 12 have been short-circuited.

After determination of short-circuit of the multiple windings, the control device 30 controls the switching unit 28 to cut off the connection between the inverter unit 18 and the synchronous motor 12. Provision of the detector 38 in the dynamic brake circuit 26 enables the control device 30 to cut off the connection between the motor driving device 10a and the synchronous motor 12 after reliably determining that the multiple windings have been short-circuited. Therefore, the motor driving device 10a and the synchronous motor 12 can be surely protected while the synchronous motor 12 can be stopped immediately.

Figure 2:
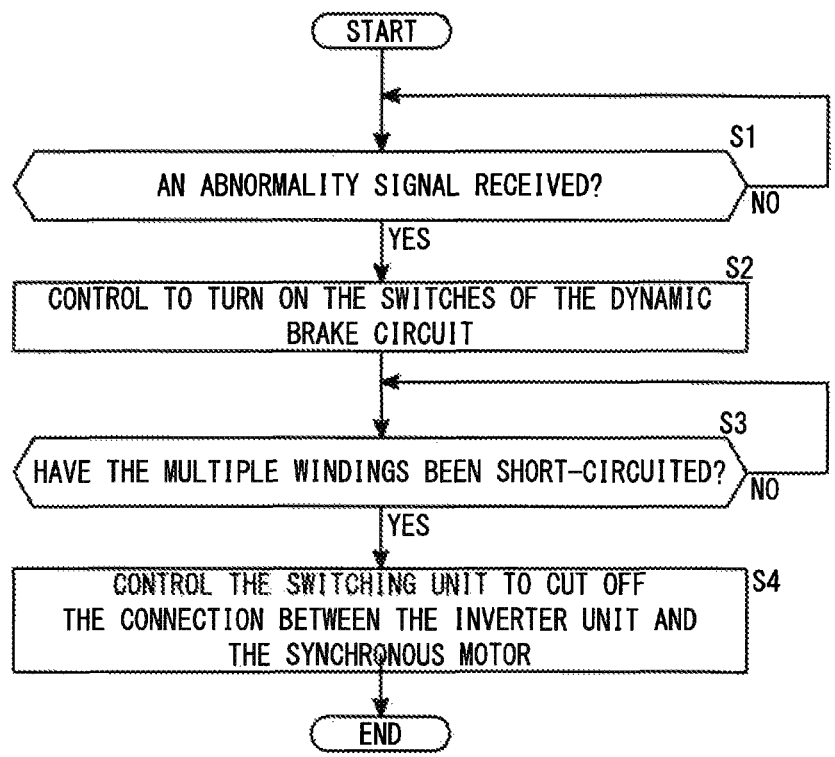
FIG. 2 is a flowchart for explaining an operation of a protection device according to the embodiment.

FIG. 2 is a flowchart for explaining the operation of the protection device 10b in the embodiment. The flow of FIG. 2 is started from the state where the synchronous motor 12 is being driven by the motor driving device 10a, that is, from the state where the switches 28u, 28v and 28w of the switching unit 28 are on while the switches 26u, 26v and 26w of the dynamic brake circuit 26 are off.

First, the control device 30 determines whether or not an abnormal signal has been received from the drive control unit 20 (step S1). When detecting an abnormality in at least one of the motor driving device 10a and the synchronous motor 12, the drive control unit 20 transmits an abnormality signal to the control device 30.

When the control device 30 determines at step S1 that an abnormal signal has not been received, the control device 30 repeats step S1. When it is determined that an abnormal signal has been sent, the control device 30 proceeds to step S2.

At step S2, the control device 30 controls the switches 26u, 26v and 26w of the dynamic brake circuit 26 to be turned on (step S2).

Then, at step S3 the control device 30 determines whether or not the multiple windings of the synchronous motor 12 have been short-circuited based on the detection signal from the detector 38 (step S3). Specifically, when the current value indicated by the detection signal exceeds a predetermined current threshold, the control device 30 determines that a short-circuit has occurred.

When the control device 30 determines at step S3 that the multiple windings have not been short-circuited, step S3 is repeated until it is determined that the windings have been short-circuited. When it is determined that the multiple windings have been short-circuited, the control goes to step S4. When occurrence of the short-circuit cannot be determined at step S3 even after a predetermined period of time has elapsed from when the switches 26u, 26v and 26w were controlled to be turned on at step S2, the control device 30 may be configured to output a failure signal to the outside so as to warn the operator.

At step S4, the control device 30 controls the switching unit 28 to cut off the connection between the inverter unit 18 and the synchronous motor 12 (step S4). Thereby, the connection between the motor driving device 10a and the synchronous motor 12 is cut off.

Figure 3:
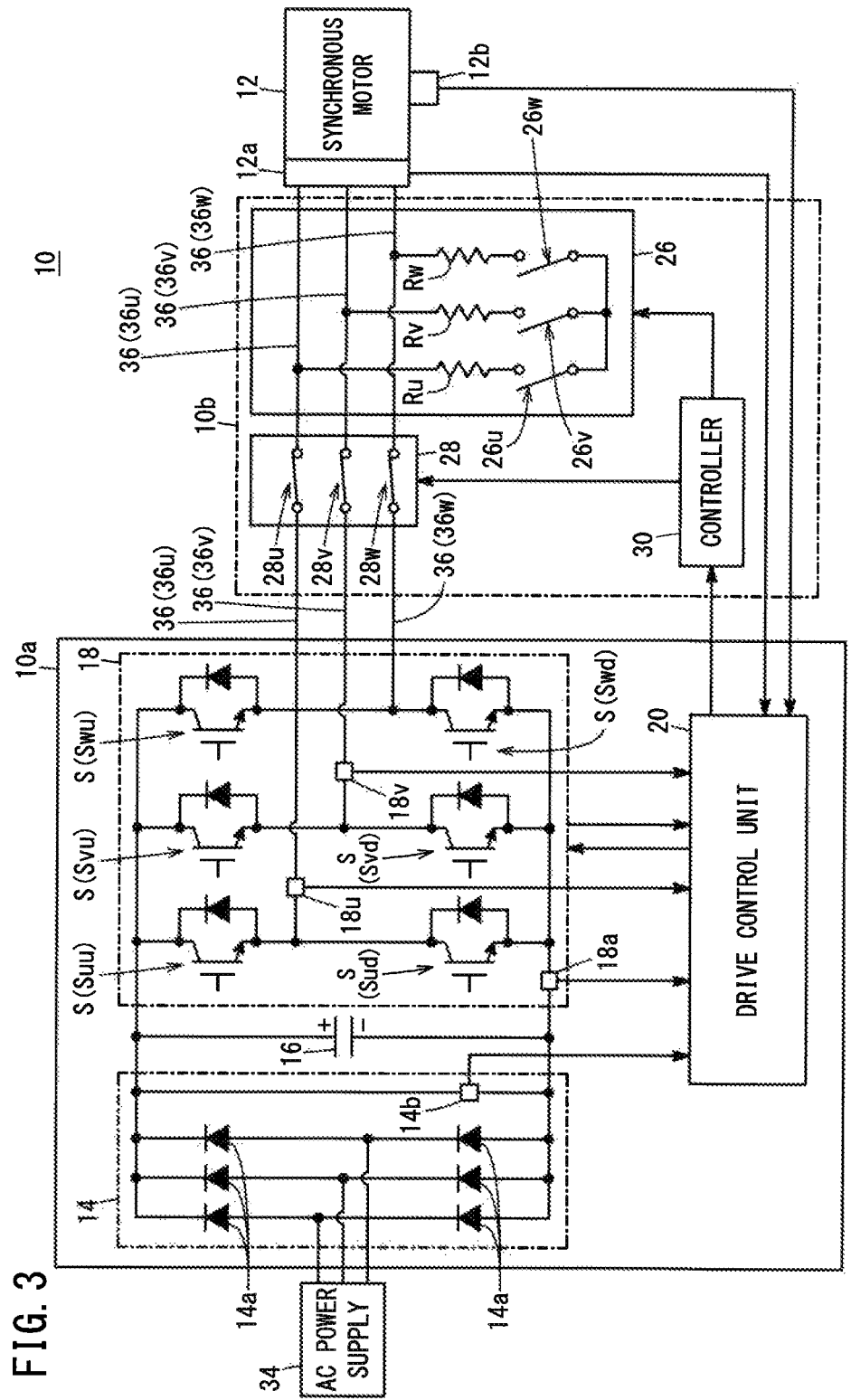
FIG. 3 is a diagram showing another configuration example of a motor drive system according to the embodiment.

FIG. 3 is a diagram showing another configuration example of a motor drive system 10 according to the embodiment. In the above description with reference to FIG. 1, the detector 38 is provided in the dynamic brake circuit 26 to determine whether a plurality of windings of the synchronous motor 12 are short-circuited. However, as shown in FIG. 3, the dynamic brake circuit 26 does not have to include the detector 38. In this case, the control device 30 determines at step S2 that the multiple windings of the synchronous motor 12 are short-circuited when the switches 26u, 26v and 26w of the dynamic brake circuit 26 are turned on. Then, the control proceeds to step S4 omitting step S3, and the control device 30 can control the switching unit 28 to cut off the connection between the inverter unit 18 and the synchronous motor 12. It is preferable that the time from the short-circuiting of the multiple windings of the synchronous motor 12 to the cutoff of the connection between the inverter unit 18 and the synchronous motor 12 is shorter, but it does not matter as long as the time is within a predetermined time. For example, the predetermined time is preferably equal to or shorter than the time limit that is determined depending on the time constant of the circuit of the motor driving device 10a.

As described above, in the protection device 10b of the embodiment, the connection between the inverter unit 18 and the synchronous motor 12 is cut off after the multiple windings of the synchronous motor 12 have been short-circuited. That is, short-circuiting in the dynamic brake circuit 26 is executed first, then the connection between the inverter unit 18 and the dynamic brake circuit 26 is cut off. As a result, the potential difference arising between the power lines 36 (36u, 36v, 36w) when short-circuited in the dynamic brake circuit 26 can be prevented from being applied to the inverter unit 18.

Therefore, the resistance values of the resistors Ru, Rv and Rw used in the dynamic brake circuit 26 can be appropriately selected without considering the withstand voltage of the motor driving device 10a including the inverter unit 18 and the smoothing capacitor 16. That is, the resistors Ru, Rv and Rw can be selected so as to have resistance values that can achieve both suppression of the short-circuit current when the dynamic brake circuit 26 short-circuits the multiple windings of the synchronous motor 12 and shortening of the time required to stop the synchronous motor 12 after being short-circuited. Thus, it is possible to protect the synchronous motor 12 and the motor driving device 10a.

In addition, if the switching unit 28 is caused to cut off the connection between the inverter unit 18 and the synchronous motor 12 before the dynamic brake circuit 26 short-circuits the multiple windings of the synchronous motor 12, excessive back electromotive force may be generated between the terminals of the synchronous motor 12, causing a risk of destruction of the synchronous motor 12. In contrast, according to the protection device 10b of the present embodiment, short-circuiting of the multiple windings of the synchronous motor 12 is performed before the connection between the inverter unit 18 and the synchronous motor 12 is cut off, the synchronous motor 12 can be reliably protected.

In the above-described embodiment, the drive control unit 20 monitors the rotation speed of the synchronous motor 12, the temperature, the current and the voltage of the windings to detect an abnormality of the synchronous motor 12. However, the control device 30 may be configured to detect an abnormality of the synchronous motor 12. In this case, the control device 30 may obtain the rotation speed of the synchronous motor 12, the temperature, the current and the voltage of the windings detected by the encoder 12a, the temperature sensor 12b, the current sensors 18a, 18u, 18v and the voltage sensor 14b, directly, or by way of the drive control unit 20.

Further, in the above-described embodiment, the control device 30 is triggered by detection of an abnormality in of the synchronous motor 12 or the motor driving device 10a to start short-circuiting the multiple windings of the synchronous motor 12 and then cut off the connection between the inverter unit 18 and the synchronous motor 12. However, the control device 30 may be configured to be triggered by an instruction from the operator to start short-circuiting the multiple windings and then cut off the connection between the inverter unit 18 and the synchronous motor 12.

MODIFIED EXAMPLES

The above embodiment may be modified as follows.

Modified Example 1

Figure 4:
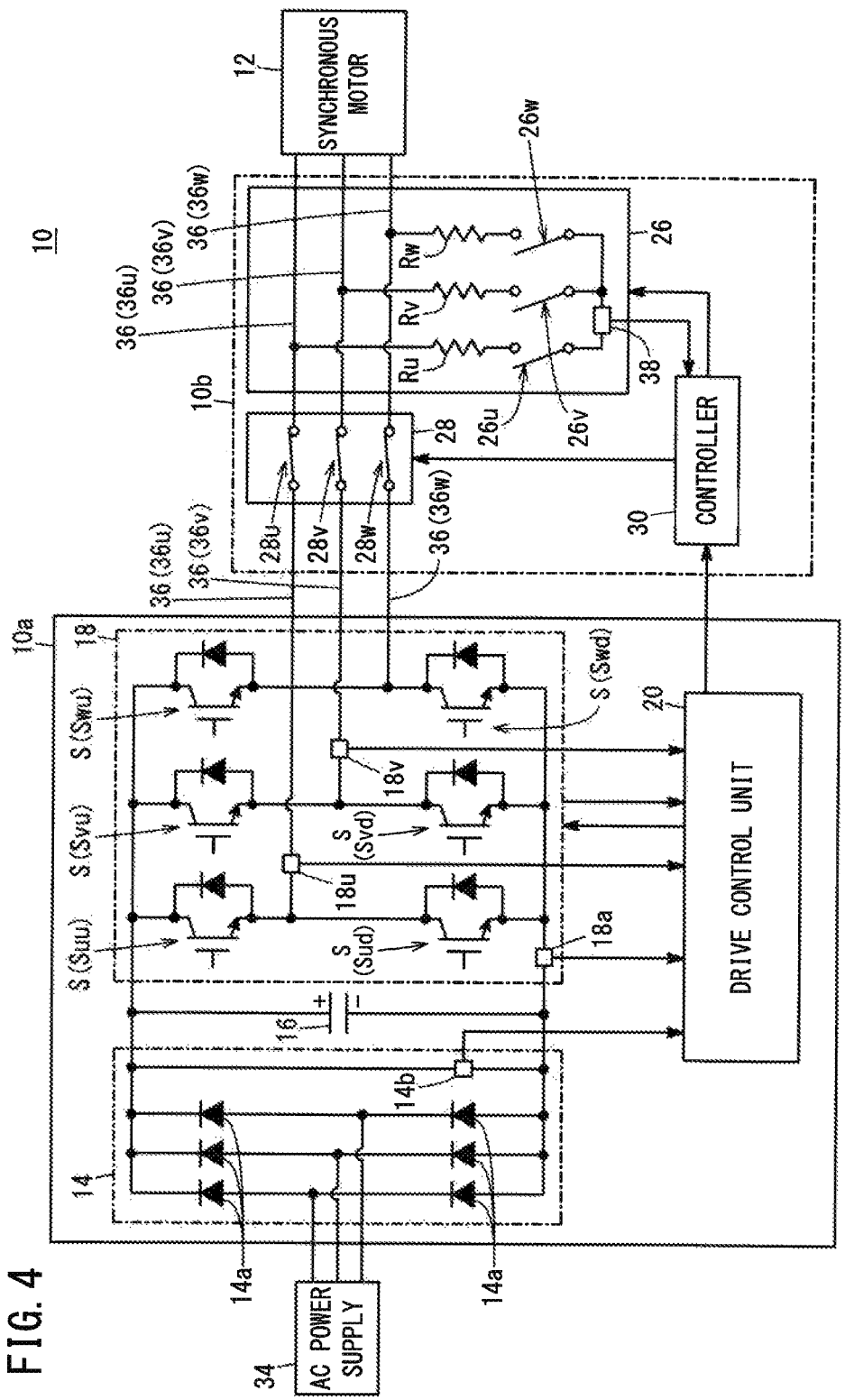
FIG. 4 is a diagram showing a configuration of a motor drive system according to a modified example 1.

FIG. 4 is a diagram for explaining a configuration of a motor drive system 10 according to a modified example 1. In the above embodiment, the synchronous motor 12 is provided with the encoder 12a and the temperature sensor 12b. However, as shown in FIG. 4, the synchronous motor 12 does not have to have the encoder 12a and the temperature sensor 12b. In this case, the rotation speed (rotation rate) of the synchronous motor 12 and the temperature of the windings can be estimated and obtained by the drive control unit 20 using the measurements of the voltage sensor 14b and the current sensors 18a, 18u, 18v.

Although certain preferred embodiments of the present invention have been shown and described in detail, it should be understood that various changes and modifications may be made therein without departing from the scope of the appended claims.

Invention Obtained from the Embodiment

The invention that can be grasped from the above embodiment will be described below.

A protection device (10b) provided between a synchronous motor (12) having a plurality of windings and a motor driving device (10a) for driving the synchronous motor (12) includes: a switching unit (28) configured to make and break the connection between the motor driving device (10a) and the synchronous motor (12); a dynamic brake circuit (26), arranged between the switching unit (28) and the synchronous motor (12), including resistors (Ru, Rv, Rw) and switches (26u, 26v, 26w), and configured to short-circuit the plurality of windings via the resistors (Ru, Rv, Rw); and a control device (30) configured to control the switching unit (28) and the dynamic brake circuit (26). The control device (30) is configured to control the switches (26u, 26v, 26w) in the dynamic brake circuit (26) to short-circuit the plurality of windings, and then control the switching unit (28) to cut off the connection between the motor driving device (10a) and the synchronous motor (12).

This configuration allows appropriate selection of the resistance values of the resistors (Ru, Rv, Rw) used in the dynamic brake circuit (26) while protecting the synchronous motor (12) and the motor driving device (10a), whereby it is possible to reliably protect the synchronous motor (12).

The dynamic brake circuit (26) may include one or more resistors (Ru, Rv, Rw) and one or more switches (26u, 26v, 26w) for each phase. The control device (30) may be configured to control the plurality of switches (26u, 26v, 26w) to short-circuit the plurality of windings via the plurality of resistors (Ru, Rv, Rw).

The dynamic brake circuit (26) may include a detector (38) for detecting the voltage across the resistors (Ru, Rv, Rw) or the current flowing through the resistors (Ru, Rv, Rw). The control device (30) may be configured to determine, based on the detection signal from the detector (38), whether or not the plurality of windings have been short-circuited, and after determining that the plurality of windings have been short-circuited, control the switching unit (28) so as to cut off the connection between the motor driving device (10a) and the synchronous motor (12). This allows the control device (30) to cut off the connection between the motor driving device (10a) and the synchronous motor (12) after reliably determining that the plurality of windings have been short-circuited. Therefore, the motor driving device (10a) and the synchronous motor (12) can be reliably protected.

The control device (30) may be configured to cause the dynamic brake circuit (26) to short-circuit the windings when an abnormality of the synchronous motor (12) or the motor driving device (10a) is detected. Thus, when an abnormality occurs in the synchronous motor (12) or the motor driving device (10a), the synchronous motor (12) can be emergency stopped.

What is claimed is:

1. A protection device provided between a synchronous motor having a plurality of windings and a motor driving device for driving the synchronous motor, comprising:
   a switching unit configured to make and break the connection between the motor driving device and the synchronous motor;
   a dynamic brake circuit, arranged between the switching unit and the synchronous motor, including resistors and switches, and configured to short-circuit the plurality of windings via the resistors; and
   a control device configured to control the switching unit and the dynamic brake circuit, wherein the control device is configured to control the switches in the dynamic brake circuit to short-circuit the plurality of windings, and then control the switching unit to cut off the connection between the motor driving device and the synchronous motor.

2. The protection device according to claim 1, wherein:
   the dynamic brake circuit includes one or more resistors and one or more switches for each phase; and

9 the control device is configured to control the plurality of switches to short-circuit the plurality of windings via the plurality of resistors.

3. The protection device according to claim 1, wherein:
the dynamic brake circuit includes a detector for detecting the voltage across the resistors or the current flowing through the resistors; and
the control device is configured to determine, based on the detection signal from the detector, whether or not the plurality of windings have been short-circuited, and after determining that the plurality of windings have been short-circuited, control the switching unit so as to cut off the connection between the motor driving device and the synchronous motor.

4. The protection device according to claim 1, wherein the control device causes the dynamic brake circuit to short-circuit the windings when an abnormality of the synchronous motor or the motor driving device is detected.

5. The protection device according to claim 1, wherein the control device is configured to determine, based on a voltage across the resistors or a current flowing through the resistors, whether or not the plurality of windings have been short-circuited, and after determining that the plurality of windings have been short-circuited, control the switching unit so as to cut off the connection between the motor driving device and the synchronous motor.

6. A protection device provided between a synchronous motor including a plurality of windings and a motor driving device for driving the synchronous motor, the protection device comprising:
a first switch configured to connect or disconnect between the motor driving device and the synchronous motor;
a dynamic brake circuit, arranged between the first switch and the synchronous motor, including a plurality of resistors and a plurality of second switches, and configured to short-circuit the plurality of windings of the synchronous motor via the plurality of resistors; and
a control device configured to control the first switch and the dynamic brake circuit, wherein the control device is configured to control the plurality of second switches to provide a selection of resistance from the plurality of resistors in the dynamic brake circuit to short-circuit the plurality of windings of the synchronous motor, and then control the first switch to disconnect between the motor driving device and the synchronous motor.

7. The protection device according to claim 6, wherein:
the dynamic brake circuit comprises one or more resistors of the plurality of resistors and one or more of the plurality of second switches for each phase of the synchronous motor; and
the control device is configured to control the plurality of second switches to short-circuit the plurality of windings via the plurality of resistors.

8. The protection device according to claim 6, wherein:
the dynamic brake circuit includes a detector for detecting a voltage across the plurality of resistors or a current flowing through the plurality of resistors; and
the control device is configured to determine, based on the detection signal from the detector, whether or not the plurality of windings have been short-circuited, and after determining that the plurality of windings have been short-circuited, control the first switch to disconnect between the motor driving device and the synchronous motor.

9. The protection device according to claim 6, wherein the control device causes the dynamic brake circuit to short-circuit the windings when an abnormality of the synchronous motor or the motor driving device is detected.

10. The protection device according to claim 6, wherein the control device is configured to determine, based on a voltage across the plurality of resistors or a current flowing through the plurality of resistors, whether or not the plurality of windings have been short-circuited, and after determining that the plurality of windings have been short-circuited, control the first switch so as to disconnect between the motor driving device and the synchronous motor.

11. A method for a protection device provided between a synchronous motor including a plurality of windings and a motor driving device for driving the synchronous motor, the method comprising:
connecting or disconnecting between the motor driving device and the synchronous motor by a first switch; and
short circuiting, by a dynamic brake circuit, the plurality of windings of the synchronous motor via a plurality of resistors, the dynamic brake circuit arranged between the first switch and the synchronous motor, including the plurality of resistors and a plurality of second switches,
wherein the plurality of second switches are controlled to provide a selection of resistance from the plurality of resistors in the dynamic brake circuit to short-circuit the plurality of windings of the synchronous motor, and then the first switch is controlled to disconnect between the motor driving device and the synchronous motor.

12. The method according to claim 11, wherein:
one or more resistors of the plurality of resistors and one or more of the plurality of second switches are provided for each phase of the synchronous motor; and
the plurality of second switches are controlled to short-circuit the plurality of windings via the plurality of resistors.

13. The method according to claim 11, further comprising:
detecting a voltage across the plurality of resistors or a current flowing through the plurality of resistors;
determining, based on the detected voltage or the detected current, whether or not the plurality of windings have been short-circuited.

14. The method according to claim 13, further comprising:
after determining that the plurality of windings have been short-circuited, controlling the first switch to disconnect between the motor driving device and the synchronous motor.

15. The method according to claim 11, further comprising causing the dynamic brake circuit to short-circuit the windings when an abnormality of the synchronous motor or the motor driving device is detected.

* * * * *